United States Patent [19]

Kurata et al.

[11] Patent Number: 5,257,335

[45] Date of Patent: Oct. 26, 1993

[54] SINGLE MODE OPTICAL FIBER DEVICE INCLUDING A SHORT LENS OPTICAL FIBER

[75] Inventors: Kazuhiro Kurata; Koya Komatsu; Koji Yamamoto, all of Tokyo, Japan

[73] Assignee: NEC Corporation, Japan

[21] Appl. No.: 824,078

[22] Filed: Jan. 23, 1992

[30] Foreign Application Priority Data

Jan. 23, 1991 [JP] Japan .................................. 3-021354

[51] Int. Cl.$^5$ .............................................. G02B 6/36
[52] U.S. Cl. ..................................... 385/78; 385/140; 385/60
[58] Field of Search .................... 385/76, 77, 78, 124, 385/73, 140, 60

[56] References Cited

U.S. PATENT DOCUMENTS

| | | | |
|---|---|---|---|
| 4,205,901 | 6/1980 | Ramsay et al. | 385/124 |
| 4,669,820 | 6/1987 | Ten Berge | 385/78 |
| 4,893,889 | 1/1990 | Iwakiri et al. | 385/140 X |
| 5,066,094 | 11/1991 | Takahashi | 385/140 X |
| 5,082,345 | 1/1992 | Cammons et al. | 385/60 |

OTHER PUBLICATIONS

"Modal Noise in Single-Mode Fibers Operated Slightly Above Cutoff", Electronic Letters Jul. 8, 1981 vol. 17 No. 14 pp. 499-500.

Primary Examiner—John D. Lee
Assistant Examiner—Phan Thi Heartney
Attorney, Agent, or Firm—Ostrolenk, Faber, Gerb & Soffen

[57] ABSTRACT

An optical terminal structure includes a single mode optical fiber having a short length, and a cylindrical member in which the single mode optical fiber is fixed. The cylindrical member has the co-axis as that of a core of the single mode optical fiber. Each of both facets of the cylindrical member is polished to have a mirror surface. The core and a clad of the single mode optical fiber have refractive indexes so that the normalized frequency in operation state of the single mode optical fiber becomes at most 2.405 as a value converted at a wavelength in use of 1.28 μm. The wavelength in use is preferably in the range of 1.29 to 1.33 μm.

4 Claims, 3 Drawing Sheets

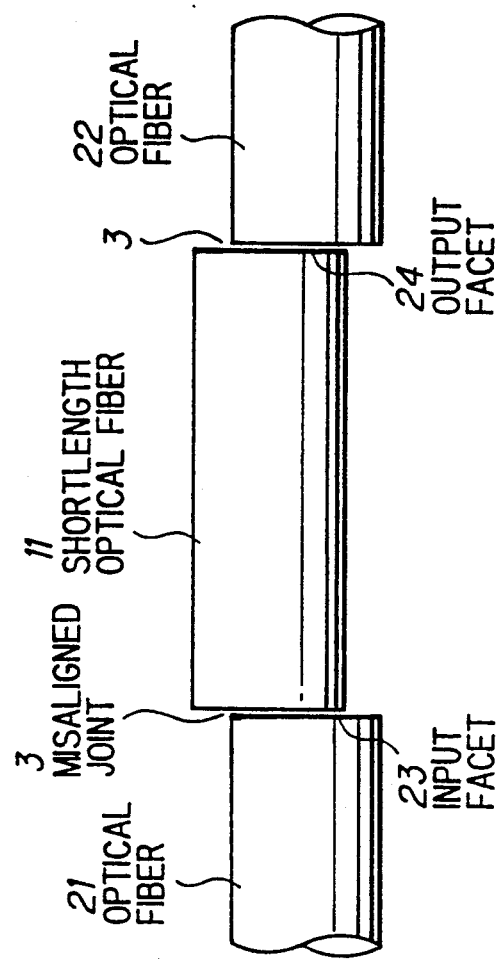
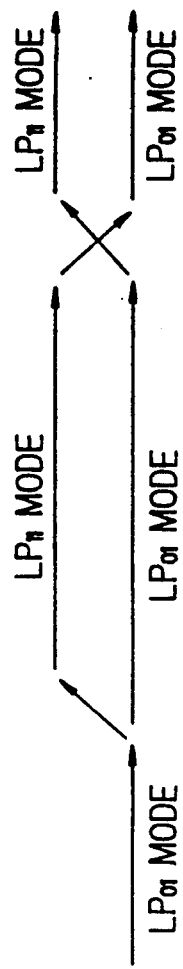
FIG.1A PRIOR ART
FIG.1B PRIOR ART

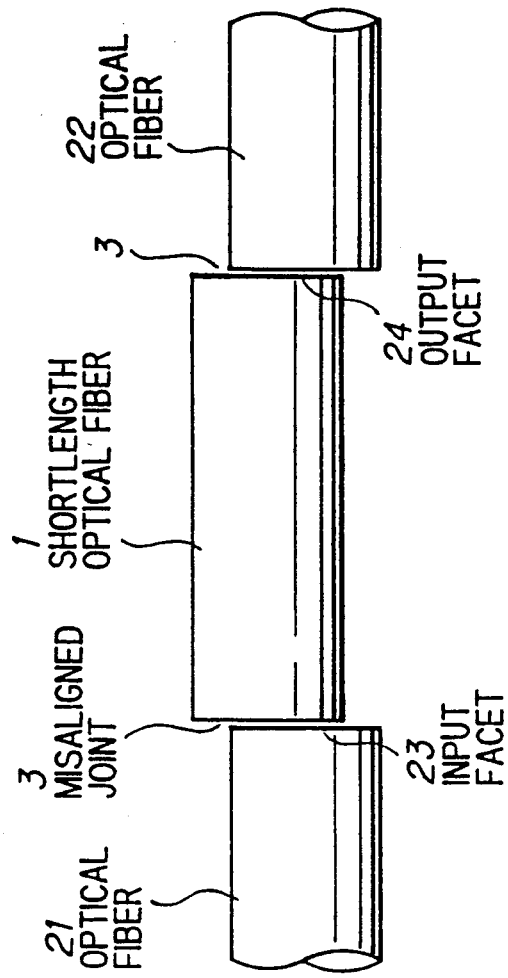
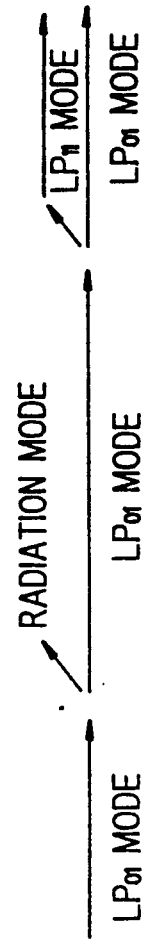
FIG. 3A
FIG. 3B

SINGLE MODE OPTICAL FIBER DEVICE INCLUDING A SHORT LENS OPTICAL FIBER

FIELD OF THE INVENTION

This invention relates to a terminal structure for an optical device, and more particularly to, a terminal structure for an optical device including a short-length optical fiber of single mode for connecting optical fibers optically.

BACKGROUND OF THE INVENTION

A conventional terminal structure for an optical device includes a short-length optical fiber of up to several tens mm fixed in a ferrule having an inside diameter slightly larger than a diameter of optical fibers to be connected through the terminal structure. The short-length optical fiber has a normalized frequency V in operation state of approximately 2.7 at a wavelength of 1.3 μm which is equivalent to a single mode fiber with no bending loss used as a long-length optical transmission path.

The normalized frequency V is defined by the following formula:

$$V = 2\pi a/\lambda \cdot (n_1^2 - n_2^2)^{\frac{1}{2}} \quad (1)$$

or the approximate formula thereof:

$$V = 2\pi a/\lambda \cdot (2\Delta)^{\frac{1}{2}} \quad (2)$$

where a is a core radius of an optical fiber, λ is a wavelength of a core light used as a signal carrier, $n_1$ and $n_2$ are refractive indexes of a core and a clad of the optical fiber respectively, and Δ is defined as $(n_1 - n_2)/n_1$.

As understood by the formulas, the normalized frequency V is inversely proportional to the wavelength λ, directly proportional to the radius a, and approximately proportional to square root of the relative difference between the two refractive indexes, that is Δ. The transmission light has a single mode when the normalized frequency V in operation state is under 2.405, and has $LP_{01}$ and $LP_{11}$ modes (linearly polarized modes 01 and 11) when the normalized frequency V is equal to or over 2.405 and under 3.83.

According to the conventional terminal structure for an optical device, however, there is a disadvantage in that there is a periodical characteristic of wavelength dependency in the transmission loss. The short-length optical fiber of the terminal structure has two misaligned joints with the connected optical fibers, $LP_{01}$ mode which is a transmission mode already existing in the optical fiber devices into $LP_{11}$ mode and $LP_{01}$ mode at the first misaligned joint. The two modes are propagated in the short-length optical fiber, and are divided $LP_{01}$ mode and $LP_{11}$ mode again at the second misaligned joint $LP_{01}$ mode which is divided from $LP_{11}$ mode and the $LP_{01}$ mode which is propergated through the short length fiber interferes each other. Therefore, the connection efficiency at the second misaligned joint has the periodical characteristic of wavelength dependency in the transmission loss. Such a wavelength periodical dependency in the transmission loss may cause changes of the transmission loss by a slight change of a wavelength in use. Further, the change of the transmission loss is affected by a misaligned degree of the joints or direction change thereof. Consequently, a slight change of the wavelength or phase of the light source is converted to a change of a light intensity by the terminal structure, so that noises are generated in the light signal.

SUMMARY OF THE INVENTION

Accordingly, it is an object of the invention to provide a terminal structure for an optical device having no wavelength dependency in characteristics.

It is another object of the invention to provide a terminal structure for an optical device in which there is little change of the transmitting loss even if there is a misaligned joint or direction change in the connections between the short-length optical fiber and the optical fiber for transmission.

It is a further object of the invention to provide a terminal structure for an optical device in which there is no noise.

According to a feature of the invention, a terminal structure for an optical device comprises:

a single mode optical fiber having a short length; and a cylindrical member in which the single mode optical fiber is fixed, the cylindrical member having the co-axis as that of a core of the single mode optical fiber, and each of both facets of the cylindrical member being polished to have a mirror surface:

wherein the core and a clad of the single mode optical fiber have refractive indexes so that a normalized frequency in operation state of the single mode optical fiber becomes at most 2.405 as a value converted at a wavelength in use of 1.28 μm.

BRIEF DESCRIPTION OF THE DRAWINGS

The invention will be explained in more detail in conjunction with appended drawings wherein:

FIGS. 1A and 1B are explanatory views illustrating a connection of optical fibers and mode changes in the conventional terminal structure;

FIGS. 3A and 3B are explanatory views illustrating a connection of optical fibers and modes changes according to the invention.

DESCRIPTION OF THE PREFERRED EMBODIMENTS

Before describing a terminal structure for an optical device in a preferred embodiment according to the invention, the conventional optical terminal structure described will be explained.

Figure 2:
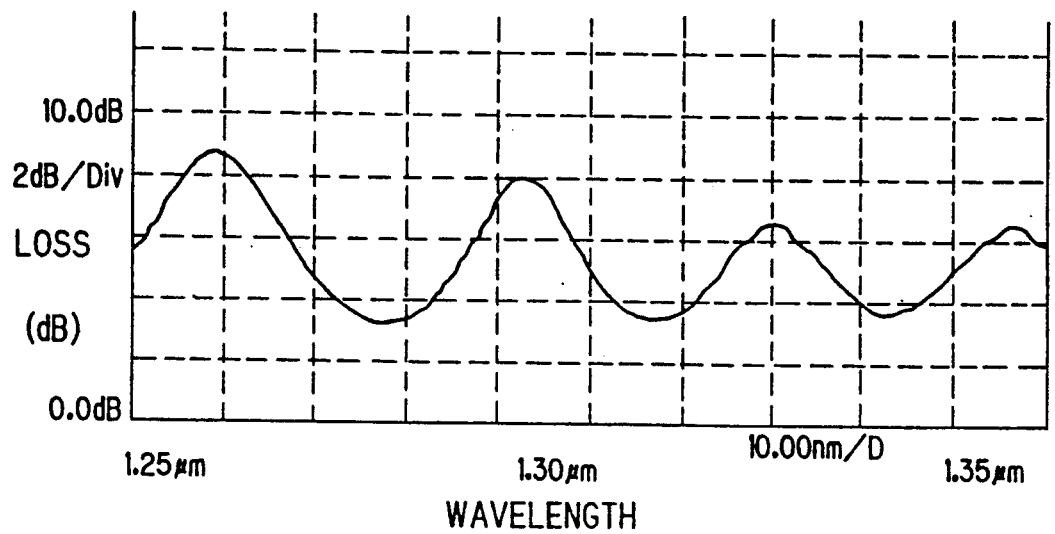
FIG. 2 is a graph showing a transmission loss of the optical fiber correlating to wavelengths.

First, the basic structure of the connection of optical fibers in the conventional optical terminal structure will be explained in conjunction with FIGS. 1A and 1B. A short-length single mode optical fiber 11 having input and output facets 23 and 24 is connected with optical fibers 21 and 22 to inevitably provide misaligned joints 3. The cutoff frequency of the normalized frequency V in operation state of the short-length single mode optical fiber 11 is approximately 2.7 at a wavelength of 1.3 μm, so that $LP_{11}$ mode is generated at the input facet 23 in addition to $LP_{01}$ mode which is a transmission mode already existing in the optical fiber 21. The divided mode $LP_{11}$ is divided inevitably provide at the output facet 24 because of the misaligned joint. Precisely, a part of the light which is transmitted through the short-length optical fiber 11 by $LP_{11}$ mode is re-converted to the $LP_{01}$ mode. The reconverted light of $LP_{01}$ and the transmission light of $LP_{01}$ interferes each other at the output facet 24. Therefore, the connection efficiency from the short-length optical fiber 11 to the optical fiber 22 has the periodical characteristic of wavelength dependency shown in FIG. 2. This is described on pages 499 and 500 of Electronics Letters, Jul. 8, 1981, Vol. 17, No. 14.

Next, the basic principle of the invention will be explained in conjunction with FIGS. 3A and 3B. A short-length single mode optical fiber 1 is connected with optical fibers 21 and 22 with misaligned joints 3. The cutoff frequency of the normalized frequency V in operation state of the short-length single mode optical fiber 1 is under 2.405 at a wavelength of 1.28 $\mu$m, so that only $LP_{01}$ mode exists at a wavelength in the range of 1.28 $\mu$m to 1.33 $\mu$m which is in practical use generally (1.31 $\mu$m in practice). Therefore, the optical loss generated at the misaligned joints 3 become radiation mode, so that the light may not reach the output facet 24. Consequently, there is no interference by occurrence of $LP_{11}$ mode, so that there is no wavelength periodical dependency in the transmission loss.

Figure 4:
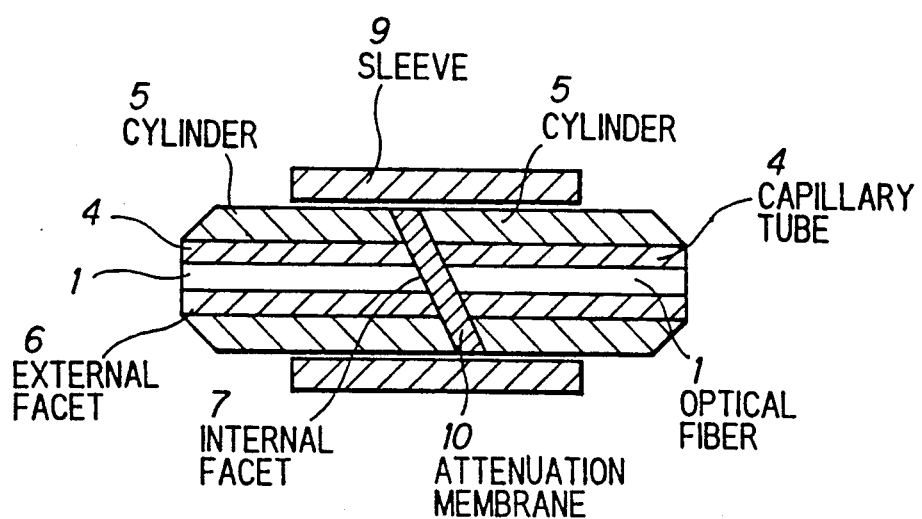
FIG. 4 is a cross-sectional view illustrating an optical fixed attenuator as an optical terminal structure in a first preferred embodiment according to the invention.

Next, an optical fixed attenuator as an optical terminal structure in a first preferred embodiment will be explained. As shown in FIG. 4, the optical fixed attenuator includes a short-length single mode optical fiber 1 having a characteristic explained above, and a capillary tube 4 in which the short-length single mode optical fiber 1 is fixed. The capillary tube 4 is fixed in a cylinder 5. The outer surface of the capillary tube 4 is processed so that the capillary tube 4 has the co-axis with a core center of the short-length single mode optical fiber 1. An external facet 6 of the optical terminal structure is optically polished so as to connect with an optical fiber for transmission, while an internal facet 7 has a predetermined angle to the right angle. A pair of cylinder units each including the short-length single mode optical fiber 1, the capillary tube 4 and the cylinder 5 are fixed to face each other with the internal facets 7 by a sleeve 9. An attenuation membrane 10 is sandwiched between the internal facets 7 of the two cylinder units. The optical fixed attenuator is connected with optical connectors at the external facets 6.

In the optical terminal structure explained above, there occurs no interference between two lights having the same mode, so that there is no wavelength dependency in the transmission loss characteristic. Therefore, the transmission loss may not change by the wavelength change or phase change of the light source caused by temperature changes. In addition, the transmission loss corresponds to the sum of the losses of the two misaligned joints, so that the change of the transmission loss due to the connection and disconnection process is as little as that in a conventional optical connector.

In these explanations, the center wavelength in use is set to be 1.31 $\mu$m, however, the center wavelength in use may be changed by determining the refractive index $n_1$ or the radium a in accordance with the formula (1). However, it is not preferable to change the refractive index $n_1$, because a reflecting light is generated at the joint by the index difference when the optical terminal structure is connected with a conventional single mode optical fiber. If the refractive index of the core of the short-length optical fiber is 1.46 and non-refractive index difference is 0.003 which is equal to a conventional one, the core radius can be determined to be approximately 4.4 $\mu$m in case of the center wavelength in use of 1.31 $\mu$m. A single mode optical fiber to be connected with the optical terminal structure generally has a core radius of approximately 5 $\mu$m, so that the difference of the radius of the two optical fibers is not so small to be negligible. However, the optical density in the outer area in the cross-section of the optical fibers is relatively small, so that the optical loss by the radium difference at the joint can be ignored practically.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. A terminal structure for an optical device, comprising:
   a single mode optical fiber having a short length which is connected to another single mode optical fiber; and
   a cylindrical member in which said single mode optical fiber is fixed, said cylindrical member being co-axial with a core of said single mode optical fiber, and each of both facets of said cylindrical member being polished to have a mirror surface;
   wherein said core and a clad of said single mode optical fiber have refractive indexes so that a normalized frequency in an operation state of said single mode optical fiber becomes at most 2.405 as a value converted at a wavelength in use of 1.28 $\mu$m.

2. A terminal structure for an optical device, according to claim 1, wherein:
   a wavelength of a light transmitted through said single mode optical fiber is in the range of 1.29 to 1.33 $\mu$m.

3. A terminal structure for an optical device, according to claim 1, wherein:
   said cylindrical member has an internal diameter slightly larger than a diameter of an optical fiber to be connected with said terminal structure, and
   said core of said single mode optical fiber has a diameter practically equal to that of said optical fiber to be connected with said terminal structure.

4. An optical attenuator, comprising:
   two optical terminal structures each comprising a single mode optical fiber having a short length, and a cylindrical member in which said single mode optical fiber is fixed, said cylindrical member having the co-axis as that of a core of said single mode optical fiber, each of both facets of said cylindrical member being polished to have a mirror surface, and said core and a clad of said single mode optical fiber having refractive indexes so that the normalized frequency in operation state of said single mode optical fiber becomes at most 2.405 as a value converted at a wavelength in use of 1.28 $\mu$m; and
   an attenuating membrane sandwiched between said two optical terminal structures;
   wherein each of said two optical terminal structures has a facet having a predetermined angle to the right angle, and said attenuating membrane is sandwiched on both sides between said facets of said two optical terminal structures.

* * * * *